United States Patent [19]
Vroom et al.

[11] Patent Number: 4,818,405
[45] Date of Patent: Apr. 4, 1989

[54] SLUDGE TREATMENT

[76] Inventors: Kenneth B. Vroom, 26 Middleridge La. S., Rollings Hills, Calif. 90274; Michael B. Rose, 764 W. 30th St., San Pedro, Calif. 90732

[21] Appl. No.: 144,818

[22] Filed: Jan. 15, 1988

[51] Int. Cl.$^4$ ............................................. C02F 11/04
[52] U.S. Cl. .................................. 210/603; 210/613; 210/770; 210/774; 71/10; 48/111
[58] Field of Search ............... 210/603, 609, 613, 631, 210/770, 771, 774, 805, 806; 71/10, 12; 48/111, 197 A

[56] References Cited

U.S. PATENT DOCUMENTS

| | | | |
|---|---|---|---|
| 3,981,800 | 9/1976 | Ort | 210/603 |
| 4,010,098 | 3/1977 | Fassell | 210/609 |
| 4,040,953 | 8/1977 | Ort | 210/603 |
| 4,057,401 | 11/1977 | Boblitz | 48/111 |
| 4,267,049 | 5/1981 | Erickson et al. | 210/609 X |
| 4,369,194 | 1/1983 | Arsovic | 71/10 X |
| 4,388,186 | 6/1983 | Fujimoto et al. | 210/603 X |
| 4,510,243 | 4/1985 | Haga et al. | 210/613 X |
| 4,632,758 | 12/1986 | Whittle | 210/603 |
| 4,657,681 | 4/1987 | Hughes et al. | 210/770 X |
| 4,769,149 | 9/1988 | Nobilet et al. | 210/603 |

*Primary Examiner*—Tom Wyse
*Attorney, Agent, or Firm*—Ashen Golant Martin & Seldon

[57] ABSTRACT

Municipal sludge is converted from an environmental problem into soil amendment and electricity. Methane, produced in an anaerobic digester (2), is used partially to generate electricity and partially to dry the concentrated sludge in a rotary dryer (7). Excess heat from the dryer is used to maintain the temperature in the digester at approximately 105° to 130° F. Heavy metals are removed so that the dried sludge can be safely used as a soil amendment.

11 Claims, 1 Drawing Sheet

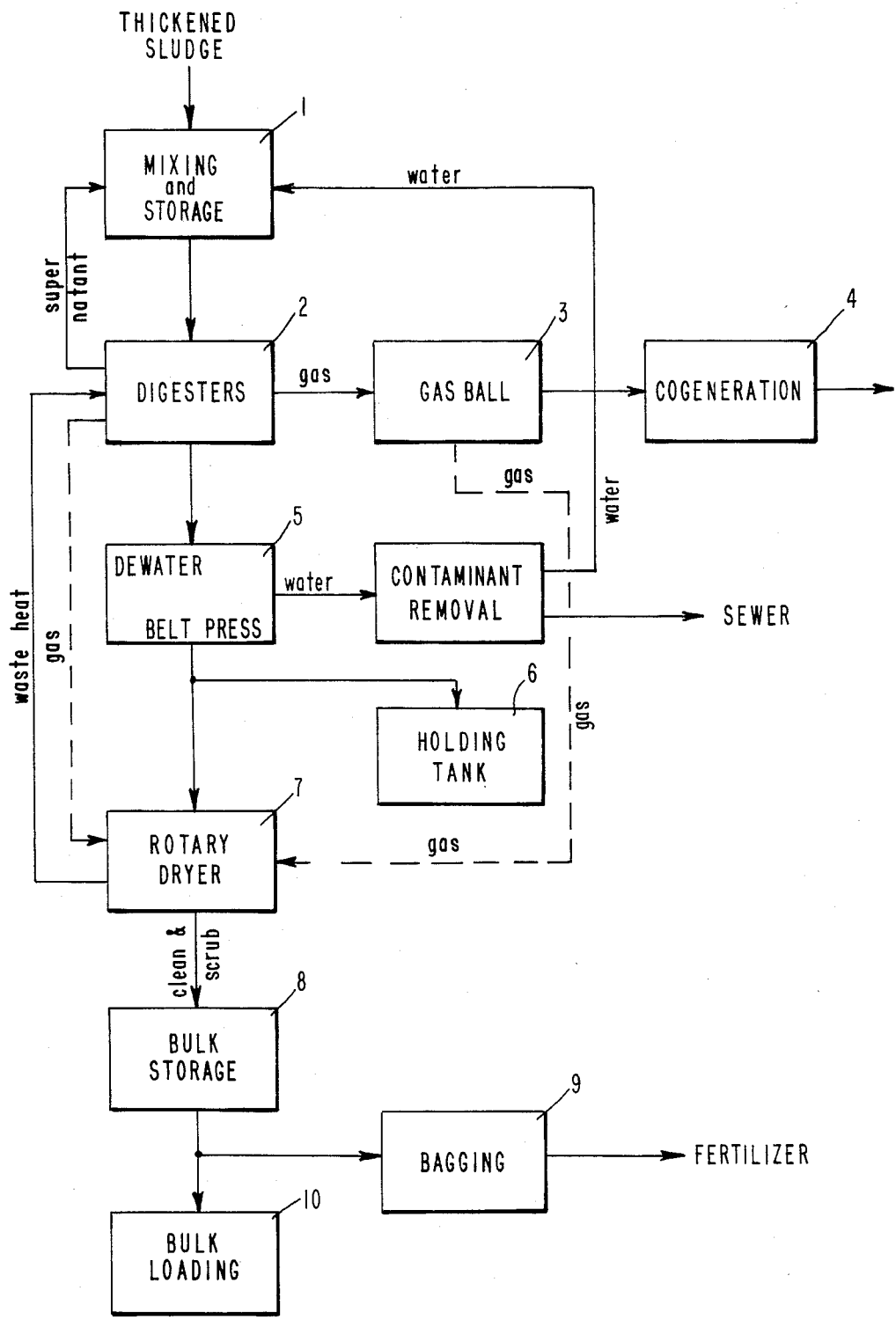

SLUDGE TREATMENT

TECHNICAL FIELD

The present invention relates to treatment of sludge, and, more particularly, to a process for converting sludge into soil amendment and electricity.

BACKGROUND ART

Sludge is the solid end product of sanitation plants. Its disposal has created problems for county and municipal governments for a long time, and these problems are becoming more severe as concern for the environment increases. Considerable effort has been expended in attempts to solve these problems, and this effort is reflected in the patent art.

Among the patents that have been granted in this area are the following U.S. patents:

U.S. Pat. No. 3,981,800 is concerned with the production of high quality of methane gas. In this process, dry manure is blended with water and seed sludge to the desired consistency and then the mixture is subjected to anaerobic digestion for a period of days in a digester. The mixture then passes into a second digester where it again is subjected to anaerobic digestion for several more days. Methane gas is recovered from each digester while some sludge is recirculated from the second digester to the first digester. Remaining sludge is thickened, partially recirculated to the blender and partially dewatered. The dewatered sludge is dried, using methane as the heat source, to form a dry marketable product, which is presumably a fertilizer.

U.S. Pat. No. 4,040,953 is directed to a process for conversion of organic material to methane gas and a residue suitable for use as a soil conditioner, organic fertilizer, or protein-rich animal feed supplement. An organic slurry, from which grit, inorganic solids and carbon dioxide have been stripped, is passed through a multi-stage anaerobic digestion for the production of methane gas. After removal of methane, the sludge is partially recycled to the carbon dioxide stripping step. The remainder of the sludge is thickened and dewatered to form a solid residue.

U.S. Pat. No. 4,267,049 converts treated sludge from raw municipal waste waters or raw agricultural wastes into organic feedstock or fertilizer. The treated sludge is passed through a hydrolytic enzyme conditioning and then tissue and cells are mechanically disintegrated. Heavy metals are removed, and the sludge is subjected to autolysis by an infusion of fresh endocellular enzymes. The autolysate product is dewatered, and the resultant solid may be used as an organic feedstock or as high quality fertilizer.

U.S. Pat. No. 4,369,194 defines a process in which manure is finely ground and then mixed with water to produce a mixture having at most 4% solids. Filaments and vegetable fibers are removed in a separator, and the liquid is fed to a bioreactor for the production of methane. After a suitable time in the digester, e.g., four days, and removal of methane, the resultant suspension is fed into a separator for removal of al solid substances. The solid substances are then dried, using methane produced in the digester as a heat source.

U.S. Pat. No. 4,388,186 concentrates waste water from a solids content of about 1% to a solids contents of about 6% to about 10% in a centrifugal condensing machine. This concentrate is then treated in an anaerobic digestion tank. The digested sludge is then dewatered and dried. Methane, which was produced in the digester, provides heat to the drier.

U.S. Pat. No. 4,632,758 utilizes a honeycombed reactor to generate methane and sludge from waste water as derived from a food processing plant. The waste water is first freed of debris such as cans, boards, and large vegetable scraps. It is then heated prior to introduction into the reactor, in which organic matter is converted into methane and sludge in an anaerobic process. Methane thus produced is used to heat the waste water prior to its introduction into the reactor; excess methane is burned off. Some sludge is recirculated to different parts of the system and the rest is withdrawn from agricultural utilization without further treatment.

DISCLOSURE OF INVENTION

The present invention is directed to a process for converting sludge into soil amendment and electricity. Methane produced in the process is used to generate electricity, which can be sold to a local utility. Waste heat from a rotary dryer is returned to digesters to maintain them at a temperature of approximately 105° to 130° F., depending on digester microbes employed, and water is recycled through the process to keep it self-contained. Any heavy metals in the sludge may be removed, either prior to or during digestion.

It is an object of the present invention to provide an efficient method of converting sludge into useful products, principally methane and soil amendment.

It is a further object of the present invention to use industrial sludge for production of electricity in a cogeneration arrangement.

The foregoing as well as other useful objects of the invention will become more readily apparent by reference to the drawing herein and the following description.

BRIEF DESCRIPTION OF THE DRAWINGS

The drawing is a flow diagram, illustrating the steps of the process.

BEST MODES FOR CARRYING OUT THE INVENTION

As seen in the drawing, thickened sludge of, for example, about 70% moisture, is received by the treatment facility and water is added in mixer 1 to provide a sludge having about 10% solids. The sludge is maintained in digesters 2 for 15 to 25 days. Typical digesters may range from about 60 to 300 feet in diameter, and commonly about 120 feet in diameter.

Heavy metals, by which is meant to include any number of metals existing naturally in the area and then concentrated in the sewage or (more commonly) industrial waste illegally dumped in the sewers, are optionally removed, either prior to or during digestion. Each metal requires its own treatment process, although some ferrous metals respond to electromagnetic separators. Such treatment processes are well-known and thus do not form a part of this invention. Examples of such processes include (1) treating incoming sludge chemically to neutralize to precipitate out the heavy metals, (2) flowing incoming sludge past electromagnetic separators, and (3) adding chemical into the digester 2 to neutralize or precipitate the heavy metals.

Anaerobic digestion occurs in the presence of microbes, causing the formation of acids and the splitting of cellular matter. The process also generates heat, and additional heat is introduced from a subsequent drying step, which will be later described. The additional heat is needed for efficient digestion and fully realized production of natural gas. Natural gas, which is a mixture of methane, carbon dioxide, and hydrogen sulfide, is produced in the process and is bled from the digester 2 into gas ball 3. The gas is stored in ball 3 until it is needed to heat the subsequent drying stage. The bulk of the gas, however, is transferred to cogeneration unit 4, where it is used to produce electricity.

A waste gas generator is the most efficient way to produce electricity. The waste gas generator is a gas turbine comprising a special alloy unaffected by any impurities in the natural gas or combustion products therefrom.

Concentrated sludge is removed from the bottom of digester 2 and transferred to belt press 5 where excess water is removed. The partially dried sludge is then transferred directly to dryer 7. Holding tank 6 is provided to comply with Environmental Protection Agency requirements for emergency storage of up to three days' capacity.

Dryer 7 is a rotary dryer that is fired by gas taken directly from the digester 2 or from gas ball 3. Commonly, dryer 7 is approximately 70 feet long. Waste heat from dryer 7 can be recycled to digester 2 to keep its temperature at approximately 105° to 130° F.

The temperature of the digester 2 is not particularly critical, and that temperature recommended for the use of designer microbes may be conveniently employed. Typically, the temperature of the digester 2 is maintained at about 120° F.

Dried product can be transferred from dryer 7 to bulk storage 8. Any exhaust gases from the dryer are cleaned and scrubbed to reduce air pollution, employing well-known processes. At this point, the dried product can be bagged at station 9 or bulk loaded at platform 10 for use as soil amendment.

Mixing and blending of the soil amendment by adding other ingredients to meet customer specifications may be done. Such ingredients may include nitrogen and phosphorus additives, as well as herbicides and the like.

It will be appreciated that the process of the invention is self-sufficient, generating its own energy needs and selling excess energy to a local utility by cogeneration.

Active sludge (Class II) is partially digested and needs no catalyst. Class I sludge, on the other hand, is merely separated and compressed and has a high chlorine content due to the addition of chlorine. The Class II sludge, or sludge directly from a sewer system, requires a catalyst to activate it.

Accordingly, in the alternative, supernatant from digester 2 can be recycled to mixer 1 and mixed with thickened sludge. This supernatant acts as a catalyst for the breakdown of the organic matter.

Thus, there has been disclosed a sludge treatment process, which produces both electricity by cogeneration and dried soil amendment. Various changes, modifications, and omissions to the foregoing description will be readily apparent to those skilled in this art without departing from the spirit of the invention as set forth in the appended claims.

What is claimed is:

1. A process for converting sludge into soil amendment, comprising digesting sludge anaerobically to produce methane, a concentrated sludge, and supernatant, mixing additional sludge with supernatant and introducing the resultant mixture to the digestion system, transferring methane that is produced to a storage area, using methane to heat a rotary dryer into which concentrated sludge has been transferred from the digestion system, drying concentrated sludge to a solid product useful as a soil amendment, and using waste heat from the dryer to maintain the digestion system at a temperature of approximately 105° to 130° F.

2. The process of claim 1 wherein heavy metals are separated prior to or during digestion.

3. The process of claim 1 wherein said digestion system is maintained at a temperature of about 120° F.

4. The process of claim 1 wherein said methane is additionally used to cogenerate electricity in a waste gas turbine.

5. A process for converting sludge into soil amendment and electricity, comprising digesting sludge anaerobically to produce methane, a concentrated sludge, and supernatant, mixing additional sludge with supernatant and introducing the resultant mixture to the digestion system, transferring methane that is produced to a storage area, using methane to cogenerate electricity in a waste gas turbine, drying concentrated sludge to a solid product useful as a soil amendment, and using waste heat from the dryer to maintain the digestion system at a temperature of approximately 105° to 130° F.

6. The process of claim 5 wherein heavy metals are separated prior to or during digestion.

7. The process of claim 5 wherein said digestion system is maintained at a temperature of about 120° F.

8. The process of claim 5 wherein additional methane is used to heat a rotary dryer into which concentrated sludge has been transferred from the digestion system.

9. A process for converting sludge into soil amendment and electricity, comprising digesting sludge anaerobically to produce methane, a concentrated sludge, and supernatant, mixing additional sludge with supernatant and introducing the resultant mixture to the digestion system, transferring methane that is produced to a storage area, using methane to cogenerate electricity in a waste gas turbine, using additional methane to heat a rotary dryer into which concentrated sludge has been transferred from the digestion system, drying concentrated sludge to a solid product useful as a soil amendment, and using waste heat from the dryer to maintain the digestion system at a temperature of approximately 105° to 130° F.

10. The process of claim 9 wherein heavy metals are separated prior to or during digestion.

11. The process of claim 9 wherein said digestion sysstem is maintained at a temperature of about 120° F.

* * * * *